United States Patent [19]
Huston et al.

[11] Patent Number: 5,938,971
[45] Date of Patent: Aug. 17, 1999

[54] LIQUID CRYSTAL SOLUTIONS HAVING A BASE OF CELLULOSE AND AT LEAST ONE PHOSPHORIC ACID

[75] Inventors: Rima Huston; Jean-Paul Meraldi, both of Zurich, Switzerland; Fabio Urso, Clermont-Ferrand; Philippe Esnault, Cebazat, both of France

[73] Assignee: Michelin Recherche et Technique S.A., Clermont-Ferrand Cedex, France

[21] Appl. No.: 08/809,752

[22] PCT Filed: Sep. 18, 1995

[86] PCT No.: PCT/CH95/00206

§ 371 Date: Mar. 18, 1997

§ 102(e) Date: Mar. 18, 1997

[87] PCT Pub. No.: WO96/09356

PCT Pub. Date: Mar. 28, 1996

[30] Foreign Application Priority Data

Sep. 19, 1994 [FR] France .................................. 94 11404

[51] Int. Cl.[6] .............................. C09K 19/52; B60C 9/12; D01F 2/02; B32B 23/02
[52] U.S. Cl. .................................. 252/299.01; 252/299.5; 152/458; 264/187; 428/357; 428/393
[58] Field of Search ............................ 252/299.01, 299.5; 428/1, 357, 393; 106/172.1, 204.01, 203.3; 152/458; 264/187

[56] References Cited

U.S. PATENT DOCUMENTS

| | | | |
|---|---|---|---|
| 4,370,168 | 1/1983 | Kamide et al. | 106/177 |
| 4,839,113 | 6/1989 | Villaine et al. | 264/28 |
| 4,926,920 | 5/1990 | Gouttebessis et al. | 152/548 |

FOREIGN PATENT DOCUMENTS

| | | |
|---|---|---|
| 714434 | 11/1941 | Germany . |
| 54859 | 2/1943 | Netherlands . |
| 263810 | 12/1926 | United Kingdom . |

OTHER PUBLICATIONS

WPI, Week 8849, Derwent Publications Ltd., London, GB; AN 88–351892 & SU 1397456 Synth. Resin, May 23, 1988.
WPI, Week 8822, Derwent Publications Ltd., London, GB; An 88–153465 & SU 1348396 Phys–Chem Problems, Oct. 30, 1987.
Patent Abstracts of Japan, vol. 17 No. 42, C–1020, JP 4258648, Cellulose Dope Sep. 14, 1992 and JP 910020067, Feb. 13, 1991.

*Primary Examiner*—Shean C. Wu
*Attorney, Agent, or Firm*—Baker & Botts LLP

[57] ABSTRACT

Liquid-crystal solutions comprising cellulose dissolved in a solvent agent. They contain more than 10% by weight of cellulose, and are optically anisotropic at rest and at room temperature. The solvent agent contains more than 85% by weight of at least one phosphoric acid, this phosphoric acid or all of these phosphoric acids having the following average formula:

$$[n(P_2O_5), p(H_2O)],$$

with $0.33 < (n/p) < 1.0$.

A method of obtaining such solutions. Production of fibers or films from these solutions. Assemblages of such fibers of films. Articles reinforced by such fibers or films or assemblages, said articles being in particular tire casings.

25 Claims, No Drawings

LIQUID CRYSTAL SOLUTIONS HAVING A BASE OF CELLULOSE AND AT LEAST ONE PHOSPHORIC ACID

This application is a 371 of PCT/CH95/00206, filed Sep. 18, 1995.

BACKGROUND OF THE INVENTION

The present invention relates to cellulose, liquid-crystal solutions having a base of cellulose, that is to say a high concentration of cellulose, as well as spun products of cellulose.

More particularly, the invention relates to liquid-crystal solutions having a base of cellulose when they are spinnable, that is to say solutions which can be spun in order to produce fibers of films having high mechanical properties.

It has been known for a long time that the production of liquid-crystal solutions is essential for the obtaining of fibers having high mechanical properties, as shown, in particular, by U.S. Pat. No. 3,767,756 relating to aramid fibers and U.S. Pat. No. 4,746,694 relating to fibers of aromatic polyesters.

Liquid-crystal solutions having a base of cellulose derivatives, as well as the fibers or films which can be obtained from these solutions have also been described in certain patents or patent applications.

U.S. Pat. Nos. 4,370,168 and 4,501,886 have, for instance, shown the existence of spinnable liquid-crystal solutions having a base of ethers or cellulose acetate dissolved in inorganic acids, which solutions make it possible to obtain fibers of high tensile strength and high modulus. The methods employed are, however, limited in their application by the following drawbacks:

- the necessity of separately preparing the derivatives and then the solutions of these derivatives;
- after spinning the solutions of derivatives, the need to regenerate the fibers, when possible, in order to obtain cellulose fibers;
- no regeneration possible in the case of ethers;
- a very lengthy regeneration (several hours), preventing operation on-line with the spinning, in the case of the acetates.

European Patent B 179,822 and the equivalent U.S. Pat. No. 4,839,113 describe the obtaining of liquid-crystal spinning solutions having a base of cellulose formate by reacting cellulose with formic acid and phosphoric acid. They also describe fibers of regenerated cellulose having high mechanical properties, obtained by regeneration of cellulose formate fibers. The processes used have numerous advantages. In particular, the use of the formate as derivative permits a derivation in situ (formylation and dissolution of the cellulose in the same solvent mixture) and a very rapid regeneration, on line with the spinning. These processes are nevertheless penalized by the recycling of a mixture of acids as well as of products of the regeneration.

Moreover, numerous attempts have been made to obtain liquid-crystal solutions of cellulose by dissolving the cellulose directly (no derivation and therefore suppression of the regeneration).

It has, for instance, been proposed to dissolve the cellulose in a mixture of N,N-dimethylacetamide (DMAC) and lithium chloride (LiCl), as described for example in U.S. Pat. No. 4,278,790. With such a system, it is not possible to obtain sufficiently concentrated solutions and their anisotropy is slight, so that it is not possible to obtain fibers which have high mechanical properties (see, for example J. Polym. Sci., Polym. Phys. Ed. 27:1477, 1989, and J. Appl. Polym. Sci. 51:583, 1994).

It has also been proposed to dissolve the cellulose directly in N-oxide tertiary amines, in particular the N-oxide of N-methylmorpholine, as described for example in U.S. Pat. No. 4,416,698. These solvents are poorly adapted to the use of highly concentrated solutions, a condition of concentration which moreover is necessary for the obtaining of a liquid-crystal phase since the temperature of use of these solutions is close to the degradation temperature of the solvent.

The Japanese patent application published under number 4-258 648 also describes solutions obtained by the direct dissolving of cellulose, some of these solutions being capable of presenting optical anisotropy under certain conditions. However, the solvent mixture proposed is formed of at least two acids, in particular sulfuric acid and phosphoric acid. The presence of two acids may result in serious complications upon recycling. Furthermore, the use of sulfuric acid entails the risk of leading to a sulfonation of the cellulose or to an extensive degradation of it, and therefore to more difficult spinning. There is also the risk of rapid corrosion of the equipment.

SUMMARY OF THE INVENTION

Entirely unexpectedly, the applicant has now found upon his research that a very simple solvent system employing only a single inorganic acid or a single type of inorganic acid made the direct dissolving of the cellulose and the obtaining of a liquid-crystal solution possible.

The liquid-crystal solution of the invention, comprising cellulose dissolved in a solvent agent, is characterized by the following features:

it contains more than 10% cellulose by weight;

it is optically anisotropic at rest and at room temperature;

the solvent agent contains more than 85% by weight of at least one phosphoric acid, this phosphoric acid or all of these phosphoric acids having the following average formula:

$$[n(P_2O_5), p(H_2O)],$$

with $0.33<(n/p)<1.0$.

The molar ratio of $P_2O_5$ and water noted above (n/p) preferably satisfies the relationship $0.5 \leq (n/p) \leq 0.75$.

The invention also concerns a process for obtaining the solution defined above. It is characterized by the following features:

cellulose is placed in contact with a solvent agent which contains more than 85% by weight of at least one phosphoric acid, this phosphoric acid or all of these phosphoric acids having the average formula $$[n(P_2O_5), p(H_2O)],$$

with $0.33<(n/p)<1.0$;

an amount of cellulose of more than 10% by weight of the mixture of cellulose plus solvent agent is used;

this cellulose is dissolved directly by kneading with the solvent agent.

The liquid-crystal solution of the invention is preferably a spinnable solution.

The invention furthermore relates to a process for the obtaining of spun products of cellulose, as well as these spun products themselves.

The process of the invention for obtaining a cellulose fiber or film comprises the following steps:

the spinnable solution defined above is transformed into a liquid extrudate having the form of a fiber or film;

the said liquid extrudate is coagulated in a coagulating medium;

the fiber or film thus obtained is washed and then dried.

The invention furthermore relates to an unregenerated cellulose fiber satisfying at least one of the following relationships:

$$Te > 70 \ cN/tex;$$

$$Mi > 1500 \ cN/tex,$$

Te being its tenacity and Mi being its initial modulus.

The invention also concerns the following products:

the reinforcing assemblages such as, for instance, cables or plied yarns each comprising at least one spun product in accordance with the invention;

the articles reinforced with the spun products in accordance with the invention, in particular the articles each reinforced by at least one fiber and/or film and/or a reinforcing assemblage in accordance with the invention, these articles being for instance articles of rubber or plastic, for instance plies, belts, tubes, and tire casings.

The invention will be readily understood from the following description and non-limitative examples.

DESCRIPTION OF THE PREFERRED EMBODIMENTS

I. MEASUREMENTS AND TESTS USED

I.1. Preliminary Remarks

In the present application there is understood, as known:

by "solution", a homogeneous liquid composition in which no solid particle is visible to the naked eye;

by "spinning solution" or "spinnable solution", a solution ready for spinning, that is to say which can be transferred directly to a spinning machine in order to be immediately spun there, without any prior transformation other than the customary operations such as degasification or filtration, for instance;

by "liquid-crystal solution", an optically anisotropic solution, that is to say one capable of depolarizing light;

by "solution at rest", a solution which is not subjected to any dynamic stress, and in particular to no shear stress;

by "room temperature", a temperature of about 20° C.;

by "spun product", any product obtained by spinning, that is to say by extrusion of a solution through a spinnerette or a hole, which spun product may, for instance, be a multifilament fiber, a monofilament fiber, a rod of large diameter or a film;

by "non-regenerated cellulose fiber", a cellulose fiber obtained directly by spinning a cellulose solution, that is to say without passing through the successive steps of derivation of the cellulose, spinning of a solution of a cellulose derivative, and then regeneration of the fibers of cellulose derivative.

I.2. Degree of Polymerization of the Cellulose

The degree of polymerization is indicated as DP. The DP of the cellulose is measured in known manner, this cellulose being in the form of powder, or being previously transformed into a powder.

First of all, the inherent viscosity IV of the cellulose is determined in accordance with Swiss standard SNV 195 598 of 1970, but at different concentrations, which vary between 0.5 and 0.05 g/dl. The inherent viscosity is defined by the equation:

$$IV = (1/C) \times Ln(t/t_o)$$

in which C represents the dry cellulose concentration, "t" represents the flow time of the dilute polymer solution, $t_o$ represents the flow time of the pure solvent in an Ubbelhode type viscosimeter, and Ln represents the natural logarithm, the measurements being carried out at 20° C.

The intrinsic viscosity [η] is then determined by extrapolation of the inherent viscosity to zero concentration.

The average molecular weight $M_W$ is given by the Mark-Houwink relationship:

$$[\eta] = K M_W^\alpha$$

in which the constants K and α are respectively: K=5.31× $10^{-4}$ and α=0.78, these constants corresponding to the solvent system used for the determination of the inherent viscosity. These values are given by L. Valtasaari in the article Tappi 48, 627, 1965.

The DP is finally calculated by the formula:

$$DP = (M_W)/162,$$

162 being the molecular weight of the elementary unit of cellulose.

When it is a question of determining the DP of the cellulose in solution, the cellulose must first of all be isolated from its solvent. One then proceeds by coagulation of the solution and then by complete washing for extraction of the acid, and finally drying. The DP is then measured in the manner described above.

I.3. Optical Properties of the Solutions

The optical isotropy or anisotropy of the solutions is determined by placing a drop of solution to be studied between linear crossed polarizer and analyzer of an optical polarization microscope and then observing this solution at rest and at room temperature.

In known manner, an optically anisotropic solution is a solution which depolarizes light, that is to say which, when placed in this manner between crossed linear polarizer and analyzer, shows transmission of the light (colored texture). An optically isotropic solution is a solution which, under the same conditions of observation, does not exhibit the above property of depolarization, the field of the microscope remaining black.

I.4. Mechanical Properties of the Spun Products

The spun products of the following examples are multifilament fibers, that is to say fibers formed of a large number of elementary filaments of small diameter (small titer) also known as spun yarn.

All the above mechanical properties are measured on fibers which have been subjected to a prior conditioning. By "prior conditioning" there is understood the storing of the fibers, before measurement, in accordance with European Standard DIN EN 20139 of September 1992 (use of a standard atmosphere: temperature of 20° C. and hygrometry of 65%).

The linear density of the fibers is determined on at least three samples, each corresponding to a length of 50 meters, by weighing said length of fiber. The linear density is given in tex (weight in grams of 1000 meters of fiber).

The mechanical properties of the fibers (tenacity, initial modulus and elongation upon rupture) are measured in known manner by means of a traction machine (machines of type 1435 or 1445 of ZWICK GmbH & Co. of Germany, corresponding to German Standards DIN 51220, 51221 and 51223). Unless otherwise expressly indicated, the manner of operation employed for these measurements is that described in German Standard DIN 53834 of January 1979. The fibers, after having received a slight preliminary protective twist (helix angle of about 6°) undergo traction over an initial length of 400 mm. All the results given are an average of 10 measurements.

The tenacity and the initial modulus are indicated in cN per tex (centinewton per tex). The elongation upon rupture is indicated in percentage. The initial modulus is defined as the slope of the linear portion of the force-elongation curve, which occurs just after the standard pretension of 0.5 cN/tex.

II. CARRYING OUT OF THE INVENTION

II.1. Raw Materials

The invention is carried out with the aid of cellulose and a solvent agent of cellulose which has been previously prepared, capable of rapidly dissolving said cellulose by simple kneading.

The cellulose may be natural cellulose or regenerated cellulose. It may be used in different forms, for instance in the form of powder or pulp. In the present application, all parts by weight of cellulose in the solution or in the mixture of cellulose plus solvent agent are uncorrected crude values not corrected for the initial water content of the cellulose, this initial content being its "natural" content, that is to say without water added. This initial water content is preferably less than 8% (by weight of cellulose).

The solvent agent of the cellulose contains more than 85% by weight of at least one phosphoric acid, this phosphoric acid or all of these phosphoric acids having the average formula:

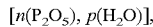

$$[n(P_2O_5), p(H_2O)],$$

with, for the molar ratio (n/p), the relationship:

0.33<(n/p)<1.0.

Preferably, the relationship is 0.5≦(n/p)≦0.75.

The solvent agent is preferably prepared from 0 to less than 15% water and more than 85% of at least one phosphoric acid (percentages by weight of the solvent agent). Even more preferably, the solvent agent is prepared solely from 0 to less than 15% water and more than 85% of at least one phosphoric acid (percentages by weight of the solvent agent). The phosphoric acid is, in particular, pyrophosphoric acid or a polyphosphoric acid.

In all cases, the solvent agent is used in liquid form for the contacting with the cellulose.

II.2. Preparation of the Solutions

For the obtaining of the solutions in accordance with the invention, cellulose is placed in contact with the solvent agent previously defined.

In order to obtain a liquid-crystal solution, it is necessary to use a minimum amount of cellulose of more than 10% by weight of the mixture of cellulose plus solvent agent. Preferably, more than 15% is used and, even more preferably, more than 20% by weight of cellulose.

The solutions are prepared by any known manner of kneading. The cellulose and the solvent agent are generally poured directly into the kneading device, said device being adapted to agitate, mix and knead the cellulose and its solvent agent properly until a solution is obtained. The kneading can be carried out, for instance, in a mixer having Z-shaped kneading arms or in a continuous screw mixer.

These kneading means are generally equipped with a heating or cooling device making it possible to adjust or control the temperature of the mixture. For the preparation of spinning solutions in particular, it is preferred to cool the solution during the course of its formation in order to limit the degradation of the cellulose. The temperature of the mixture is preferably thus maintained at a temperature of less than 20° C. The kneading means are preferably also equipped with a vacuum evacuation device and an extrusion screw in order to be able to degasify the solution before its transfer to a spinning unit, when a spinning solution is concerned.

The kneading means may also consist simply of small known laboratory reactors, these reactors being equipped with a double jacket for cooling and with a mechanical agitator. This is in particular preferable for small scale tests, for instance for prior optimization tests before preparation of solutions for spinning. The preparation of solutions in accordance with the invention can be effected also on a very small scale (a few grams of solution for instance) by mixing the cellulose and the solvent agent "by hand" by means of a spatula, in a small laboratory receptacle of the beaker type.

The kneading time necessary is to be sure a function of the means employed and of the composition of the solution, in particular its cellulose concentration. It may vary, for instance, from a few tens of minutes (for instance 30 minutes to 1 hour for a spinning solution prepared in a large mixer) up to several hours, for instance for laboratory tests.

After reading the description and the embodiments which follow, the person skilled in the art will be able to define, in accordance with the special conditions of preparation, the kneading times which are necessary.

II.3. Characteristics of the Solutions

The mixture of cellulose and solvent agent thus obtained is first of all checked to verify that it is actually a solution (absence of solid particles visible to the naked eye). If it is, then a sample of the solution is examined under a polarization microscope in order to determine its optical properties.

The liquid-crystal solutions of the invention are more of less viscous liquids. The are optically anisotropic at rest and at room temperature. It is to be noted that no dynamic stress, in particular no shearing stress or reduction of temperature as compared with the room temperature must be applied to these solutions in order to show their optical anisotropy. The solutions of the invention furthermore remain liquid-crystal at temperatures which are generally definitely greater than room temperature, for instance which may exceed 30° C. or more.

Preferably, the solutions of the invention have a cellulose concentration of more than 15% by weight and, more preferably, more than 20% by weight.

The liquid-crystal solutions of the invention are preferably spinnable solutions, which can be spun in the manner indicated in the following section.

II.4. Spinning of the Solutions

This section concerns the preferred solutions of the invention, that is to say spinnable solutions.

After having been deaerated, for instance directly in the kneading means, the solution is then transferred, for instance by means of an extrusion screw, into a reservoir which is provided with a piston. The vacuum is maintained during this stage. The solution is then stored preferably at a negative temperature (for instance between 0° C. and −10° C.) in order to avoid degradation. The solution can thus be stored, at low temperature, for several days or else it can be spun immediately. The spinning is preferably effected on line continuously with the step of the production of the solution.

At the time of spinning, the solution is extruded from the piston reservoir in order to fill an extraction pump which, in its turn, pumps the solution in succession through a fine cartridge filter and then the spinning block up into the spinning pump. From there, the solution is then extruded through a spinnerette formed of at least one capillary or at least one slit. The solution is thus transformed into a liquid extrudate, formed of at least one liquid vein, having the form of a fiber or of a film. The temperature of the solution and its speed of passage in the capillary or the slit of the spinnerette are, by convention, referred to as the spinning temperature and the spinnerette speed respectively.

In known manner, the cellulose fiber or film is formed in a coagulation bath by precipitation of the cellulose (separation from its solvent agent) under the action of a coagulant liquid. This liquid, referred to hereinafter as coagulating medium, preferably has a base of alcohol or ketone, or even more preferably a base of methanol or acetone.

Upon emergence from the coagulation bath, the spun product is taken up on a drive device, for instance on motorized cylinders. The speed of the spun product on this drive device is, by convention, referred to as the spinning speed. The ratio between this spinning speed and the spinnerette speed defines what is currently known as the spinning-stretch factor, abbreviated SSF.

Washing is then effected, preferably with water, by continuous passage of the spun product through baths or washing booths in order to eliminate the remaining solvent agent. The spun product which has been washed in this manner is then dried by any known means, for instance on heating electric rollers.

The spinnable solutions of the invention are preferably spun with a spinnerette which is not immersed in the coagulating medium, in accordance with the non-coagulating-layer spinning technique ("dry-jet-wet spinning"), as described, for instance, in European Patent B-179 822 and U.S. Pat. No. 4,839,113. In this technique, the spinnerette is arranged horizontally No. few millimeters or centimeters above the coagulation bath. It is upon passage through this non-coagulating layer, generally a layer of air ("air gap") that each liquid vein coming from the spinnerette is stretched (SSF>1) before the coagulation so as to orient the polymer molecules in the best possible manner in the flow and thus prepare the mechanical properties of the finished product. It is to be noted that non-coagulating layers other than air gaps could be used.

The cellulose fibers of the invention, characterized by the fact that they are non-regenerated fibers, preferably satisfy at least one of the following relationships:

Te>70; Mi>1500,

Te being their tenacity in cN/tex, and Mi being their initial modulus in cN/tex.

Even more preferentially, they satisfy at least one of the following relationships:

Te>90; Mi>2500.

III. EXAMPLES OF PREPARATION

The tests described below can either be tests in accordance with the invention or tests not in accordance with the invention. In all of these tests, cellulose in powdered form (Procter & Gamble) is used, the degree of polymerization of which is close to 500 and the initial water content of which is 6%, the water used for the solvent agent being demineralized water.

In all these tests, either pyrophosphoric acid or a polyphosphoric acid is furthermore used.

The pyrophosphoric acid ($H_4P_2O_7$) used here is an acid of a purity of approx 95%, marketed by Riedel-de-Haen. The molar ratio (n/p) corresponding to this phosphoric acid is 0.5.

The polyphosphoric acid used here, sold by the Fluka Company, is an 85% polyphosphoric acid, i.e. its concentration is 85% by weight $P_2O_5$. The corresponding molar ratio (n/p) is 0.75, its composition being as follows (% by weight):

about 60% of trimer $H_5P_3O_{10}$;

about 15% of pyrophosphoric acid $H_4P_2O_7$;

about 10% of mesomer $(HPO_3)_6$;

about 15% of polymetaphosphoric acid $(PHO_3)_x$.

III.1. Test A

This test describes an example in accordance with the invention in which a solution is produced by the direct dissolving of cellulose in a mixture of polyphosphoric acid and water.

6.9 g of polyphosphoric acid (87% by weight of the mixture) and 1.0 g of water (13% by weight of the mixture) are first of all mixed in a beaker and then set aside for a few seconds at room temperature for cooling. 2.1 g of cellulose are then added, followed by kneading, with the use of a spatula, for 10 minutes at room temperature (20° C.).

In this way there is obtained a viscous solution (solution S1) containing 21% by weight of cellulose. Checked by an optical polarization microscope at room temperature and at rest, this solution shows strong optical anisotropy. Furthermore, a fast test, in which it is attempted to draw out a drop of solution by means of a spatula tip, shows that this solution is capable of giving threads. This indicates that such a solution, prepared, to be sure, in sufficient amount, has a good chance of being a spinnable solution.

III.2. Test B

This test describes an example in accordance with the invention in which a solution is prepared by direct dissolving of cellulose in pyrophosphoric acid.

The pyrophosphoric acid is heated to 60° C. to make it liquid and then cooled to room temperature. It is then used immediately in this liquid form. In this way, 7.5 g of acid and 2.5 g of cellulose are placed in contact with each other, whereupon kneading is effected for 10 minutes, as indicated in Test A above. In this way, there is obtained a very viscous, strongly anisotropic solution (solution S2) containing 25% by weight cellulose. The same remark is made as previously with regard to the ability of the solution to produce threads.

III.3. Test C

This test describes three examples in accordance with the invention in which three solutions of cellulose are prepared containing 16% (solution S3), 20% (solution S4), and 30% (solution S5) of cellulose by weight respectively. The solvent agent consists solely of pyrophosphoric acid. The three solutions are prepared in the manner indicated above for Tests A and B, the desired amounts of cellulose and solvent agent being kneaded for 10 minutes.

The mixture obtained in the three cases is a solution the viscosity of which increases with the cellulose concentration. These solutions are liquid-crystal at room temperature and at rest. Each of them has the ability to produce threads when a drop is drawn with the tip of spatula.

III.4. Test D

This test describes three examples in accordance with the invention in which three cellulose solutions containing 20% by weight of cellulose are prepared. The solvent agent, having a base of pyrophosphoric acid, is prepared by mixing variable proportions of the pyrophosphoric acid and water, as indicated below:

for solution S6: 96% acid, 4% water;

for solution S7: 91% acid; 9% water;

for solution S8: 87% acid, 13% water.

The three solutions are then prepared by mixing the desired amounts of cellulose and solvent agent for 1 hour in a small 0.5 liter laboratory reactor equipped with a double jacket (cooled to −5° C.) and a mechanical stirrer. The mixtures thus obtained are in all three cases a liquid-crystal solution at room temperature and at rest. The analysis of the degree of polymerization of the cellulose in the solution moreover gives the following results: 395 (S6); 400 (S7); 400 (S8). These solutions are capable of producing threads.

III.5. Test E

This test describes three examples not in accordance with the invention, in which three solutions (S9, S10, and S11) containing 9% by weight cellulose are prepared. The solvent agent is formed by a mixture of polyphosphoric acid and water, in the following proportions:

for solution S9: 84% acid, 16% water;

for solution S10: 80% acid, 20% water;

for solution S11: 78% acid, 22% water.

The method employed, therefore, is not a method in accordance with the invention.

The mixture of cellulose and solvent agent is kneaded for 1 hour in a small laboratory reactor, as indicated in Test D above. The mixtures thus obtained are actually solutions. However, none of these three solutions shows optical anisotropy at room temperature and at rest.

III.6. Test F

This test describes an example not in accordance with the invention in which it is attempted to prepare a solution (S12) containing 18% by weight of cellulose. The solvent agent is a mixture of polyphosphoric acid (82% by weight of the mixture) and water (18% by weight of the mixture). The method used is therefore not in accord with the invention.

Mixing is effected as indicated in Test D above. At the end of 2 hours, the cellulose has still not dissolved. No solution in accordance with the invention is obtained, even by increasing the mixing time.

III.7. Test G

This test describes three examples in accordance with the invention in which three cellulose solutions are prepared containing 12% (S13), 16% (S14), and 22% (S15) by weight of cellulose. The solvent agent, having a base of polyphosphoric acid and water, is prepared by mixing variable proportions of acid and water as indicated below:

for solution S13: 91% acid, 9% water;

for solution S14: 95% acid, 5% water;

for solution S15: 87% acid, 13% water.

The desired amounts of cellulose and solvent agent are mixed for 1 hour in a small laboratory reactor, as indicated in Test D above. Three solutions are thus obtained after kneading for 1 hour. They are all three liquid-crystal at room temperature and at rest, and also able to form threads.

III.8. Test H

This test describes an example in accordance with the invention in which 1500 g of solution (solution S16) containing 21% by weight of cellulose are prepared. The solution is produced in a 2-liter mixer having Z-shaped kneading arms and equipped with a double jacket for cooling.

1035 grams of polyphosphoric acid (87% by weight of the mixture) and 150 g of water (13% by weight of the mixture) are previously mixed, with cooling (+5° C.), in a double-jacket reactor. The solvent agent thus obtained is then introduced into the 2-liter Z-arm mixer. 315 g of cellulose are then added and mixing is effected for 1 hour while maintaining the temperature of the mixture at a value equal to at most 18° C. (double jacket cooled to about −10° C.).

There are thus obtained 1.5 kg of cellulose solution (degree of polymerization equal to about 420), exhibiting strong anisotropy at room temperature and at rest. This solution is capable of producing threads.

III.9. Test I

This test describes an example of a solution in accordance with the invention. In this test, more than 26 kg of solution (solution S17) containing 22% by weight of cellulose are prepared. This spinnable solution in accordance with the invention is then used to form cellulose fibers (Examples I-1 and I-2).

18,200 g of polyphosphoric acid (87% by weight of the mixture) and 2675 g of water (13% by weight of the mixture) are previously mixed in order to obtain the solvent agent, as indicated in Test H above. The solvent agent is then introduced into a 25-liter mixer with double jacket (cooled to 0° C.) also having Z-shaped kneading arms. 5,890 g of cellulose are then added and mixing is effected for 1 hour under a vacuum of 8 mbar in order to degasify the solution, while maintaining the temperature of the mixture at a value of at most 17° C. (double jacket cooled to about −20° C.).

The solution, which is maintained under vacuum was then extruded towards the spinning installation. The solution obtained is liquid-crystal at room temperature and at rest. The degree of polymerization of the cellulose in the solution is about 420.

This solution is spun in the manner indicated in section II.4. through a spinnerette having 250 capillaries of a diameter of 65 micrometers, in accordance with the so-called "spinning with non-coagulated layer" technique (dry-jet-wet spinning) and a thickness of the air gap of 45 mm. The specific conditions of the spinning are indicated below.

Example I-1: The spinning temperature is 39° C. The spinnerette speed is 5.5 meters/min and the spinning speed is 50 meters/min, which corresponds to a SSF of 9.1 The coagulating medium used in this test is acetone at −20° C. After washing with water (temperature of 10° C.), the fiber is dried at a temperature of 90° C.

There is thus obtained a cellulose fiber, formed of 250 elementary filaments, the mechanical properties of which are as follows:

linear density: 37 tex;

tenacity: 97 cN/tex;

initial modulus: 2950 cN/tex;

elongation upon rupture: 4.4%.

Example I-2: From this same solution, cellulose fibers are produced by proceeding in the manner as set forth in Example I-1 above, except for the spinnerette speed which is equal to 5.3 meters/min, the spinning speed which is equal to 40 meters/min (SSF equal to 7.6), and the temperature of the acetone (−16° C.).

The mechanical properties of the cellulose fiber are as follows:

linear density: 44 tex;

tenacity: 99 cN/tex;

initial modulus: 2960 cN/tex;

elongation upon rupture: 4.6%.

In conclusion, the invention therefore makes it possible to obtain liquid-crystal solutions of cellulose by direct dissolving of this cellulose. This is done by means of a very simple solvent system and within particularly short periods of time, which makes the method particularly attractive from an industrial standpoint.

Without derivation step, and therefore without passing through regeneration treatments, it is thus possible to obtain cellulose fibers having very high mechanical properties, these fibers being non-regenerated fibers.

The invention is, of course, not limited to the examples described above.

Thus, for example, different components can possibly be added to the cellulose and the solvent agent before or during the kneading, without going beyond the scope of the invention.

Such constituents, if they are present, are present in a minor proportion, the total of their parts by weight in the final solution being preferably less than 10%, and even more preferably less than 5%.

By way of example, these additional components could be other inorganic acids or else salts, solvents such as alcohols, or plasticizers, various polymers capable of dissolving with the cellulose, other fillers or additives making it possible, for instance, to accelerate the dissolving of the cellulose or to improve the spinnability of the solutions obtained and/or the properties of the fibers spun from these solutions, for instance their mechanical properties, their endurance properties, or their adhesivity to a rubber matrix.

We claim:

1. A liquid-crystal solution comprising cellulose dissolved in a solvent agent, characterized by the following points:

it contains more than 10% by weight of cellulose;

it is optically anisotropic at room temperature and at rest;

the solvent agent contains more than 85% by weight of at least one phosphoric acid, this phosphoric acid or all of these phosphoric acids having the average formula:

$$[n(P_2O_5), p(H_2O)],$$

with $0.33<(n/p)<1.0$.

2. A solution according to claim 1, characterized by the relationship:

$0.5\leq(n/p)<0.75$.

3. A solution according to claim 1, characterized by the fact that the solvent agent is prepared from 0 to less than 15% water and more than 85% of at least one phosphoric acid (percentages by weight of the solvent agent).

4. A solution according to claim 2, characterized by the fact that the solvent agent is prepared solely from 0 to less than 15% water and more than 85% of at least one phosphoric acid (percentages by weight of the solvent agent).

5. A solution according to claim 1, characterized by the fact that the phosphoric acid is pyrophosphoric acid or a polyphosphoric acid.

6. A solution according to claim 1, characterized by the fact that it contains more than 15% by weight of cellulose.

7. A solution according to claim 1, characterized by the fact that it is a spinning solution.

8. A method of obtaining a solution according to claim 1, characterized by the following features:

the cellulose is contacted with a solvent agent which contains more than 85% by weight of at least one phosphoric acid, this phosphoric acid or all of these phosphoric acids having the average formula:

$$[n(P_2O_5), p(H_2O)],$$

with $0.33<(n/p)<1.0$;

an amount of cellulose of more than 10% by weight of the mixture of cellulose plus solvent agent is used;

this cellulose is dissolved directly by kneading with the solvent agent.

9. A method according to claim 8, characterized by the relationship:

$0.5\leq(n/p)\leq0.75$.

10. A method according to claim 8, characterized by the fact that the solvent agent is prepared from 0 to less than 15% water and more than 85% of at least one phosphoric acid (percentages by weight of the solvent agent).

11. A method according to claim 9, characterized by the fact that the solvent agent is prepared solely from 0 to less than 15% water and more than 85% of at least one phosphoric acid (percentages by weight of the solvent agent).

12. A method according to claim 8, characterized by the fact that the phosphoric acid is pyrophosphoric acid or a polyphosphoric acid.

13. A method according to claim 8, characterized by the fact that an amount of cellulose of more than 15% by weight of the mixture of cellulose plus solvent agent is used.

14. A method of obtaining a cellulose fiber or film comprising the following steps:

the solution in accordance with claim 7 is transformed into a liquid extrudate having the form of a fiber or a film;

said liquid extrudate is coagulated in a coagulating medium;

the fiber or film thus obtained is washed and dried.

15. A method according to claim 14, characterized by the fact that the coagulating medium has a base of alcohol or ketone.

16. A method according to claim 14, characterized by the fact that it is used in accordance with the spinning technique known as spinning with non-coagulating layer ("dry-jet-wet spinning").

17. A fiber or film obtained by a method according to claim 14.

18. A reinforcement assembly comprising at least one fiber or film according to claim 17.

19. An article reinforced by at least one fiber or film according to claim 17.

20. A non-regenerated cellulose multifilament fiber having a tenacity of greater than 70 cN/tex and/or an initial modulus of greater than 1500 cN/tex.

21. A fiber according to claim 20, having a tenacity of greater than 90 cN/tex and/or an initial modulus of greater than 2500 cN/tex.

22. A reinforcement assembly comprising at least one fiber according to claim 20.

23. An article reinforced by at least one fiber according to claim 20.

24. An article according to claim 19 characterized by the fact that it is a tire.

25. An article according to claim 23 characterized by the fact that it is a tire.

* * * * *